Nov. 26, 1940. V. W. LEONARD Re. 21,635

SIGNALING SYSTEM AND APPARATUS

Original Filed Aug. 8, 1935 3 Sheets-Sheet 1

Inventor:
Vincent W. Leonard,
by Harry E. Dunham
His Attorney.

Nov. 26, 1940. V. W. LEONARD Re. 21,635

SIGNALING SYSTEM AND APPARATUS

Original Filed Aug. 8, 1935 3 Sheets-Sheet 2

Inventor:
Vincent W. Leonard,
by Harry E. Dunham
His Attorney.

Nov. 26, 1940. V. W. LEONARD Re. 21,635

SIGNALING SYSTEM AND APPARATUS

Original Filed Aug. 8, 1935 3 Sheets-Sheet 3

Inventor:
Vincent W. Leonard,
by Harry E. Dunham
His Attorney.

Reissued Nov. 26, 1940 Re. 21,635

UNITED STATES PATENT OFFICE 21,635

SIGNALING SYSTEM AND APPARATUS

Vincent W. Leonard, Saugus, Mass., assignor to General Electric Company, a corporation of New York Original No. 2,194,310, dated March 19, 1940, Serial No. 35,316, August 8, 1935. Renewed December 13, 1939. Application for reissue October 4, 1940, Serial No. 359,779

20 Claims. (Cl. 177—338)

My invention relates to signaling systems and apparatus and more particularly to signal systems and controllers for controlling street traffic.

One object of my invention is to provide an improved system of control wherein the operating relationship between controllers can be changed from a central control point in such manner that only a predetermined signal at each intersection will be affected during the change period.

Another object of my invention is to provide an improved signal controller which may be adjusted from a central control point to operate a series of signals on any one of a plurality of predetermined time schedules.

Another object of my invention is to provide an improved system of traffic signal control whereby from a central point a series of controllers may be simultaneously controlled to operate their respective traffic signals on any one of a plurality of different time schedules and in predetermined operating relationships to each other.

Another object of my invention is to provide an improved control dial whereby the relationship between the controllers and the signal periods at each controller may be easily adjusted.

For a better understanding of my invention, together with other and further objects thereof, reference is had to the following description, taken in connection with the accompanying drawings, and its scope will be pointed out in the appended claims.

Figure 3:
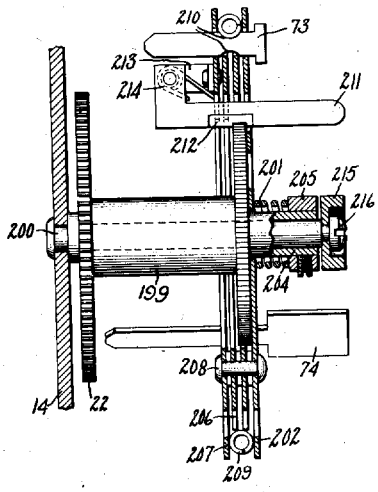
Figure 2:
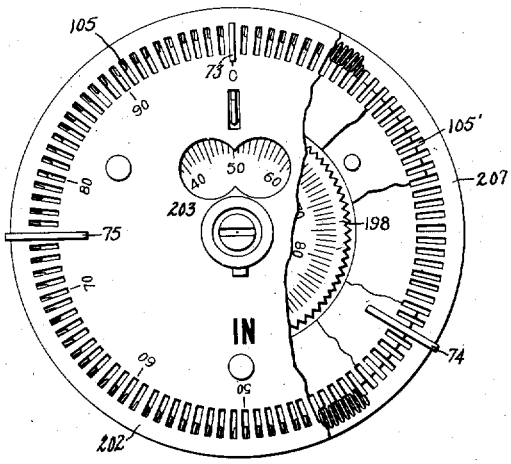
Figure 1:
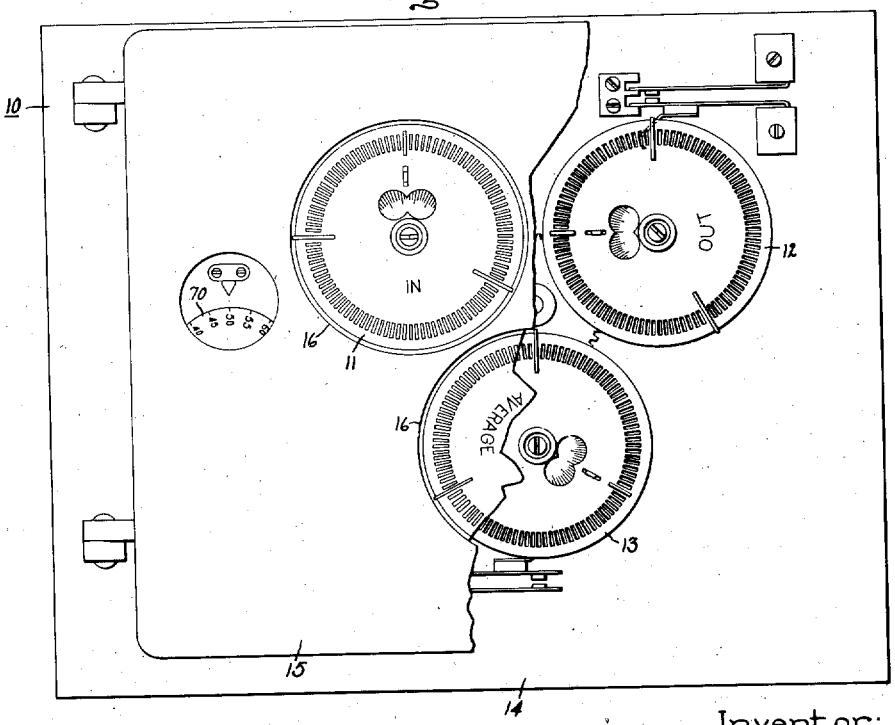
Figure 4:
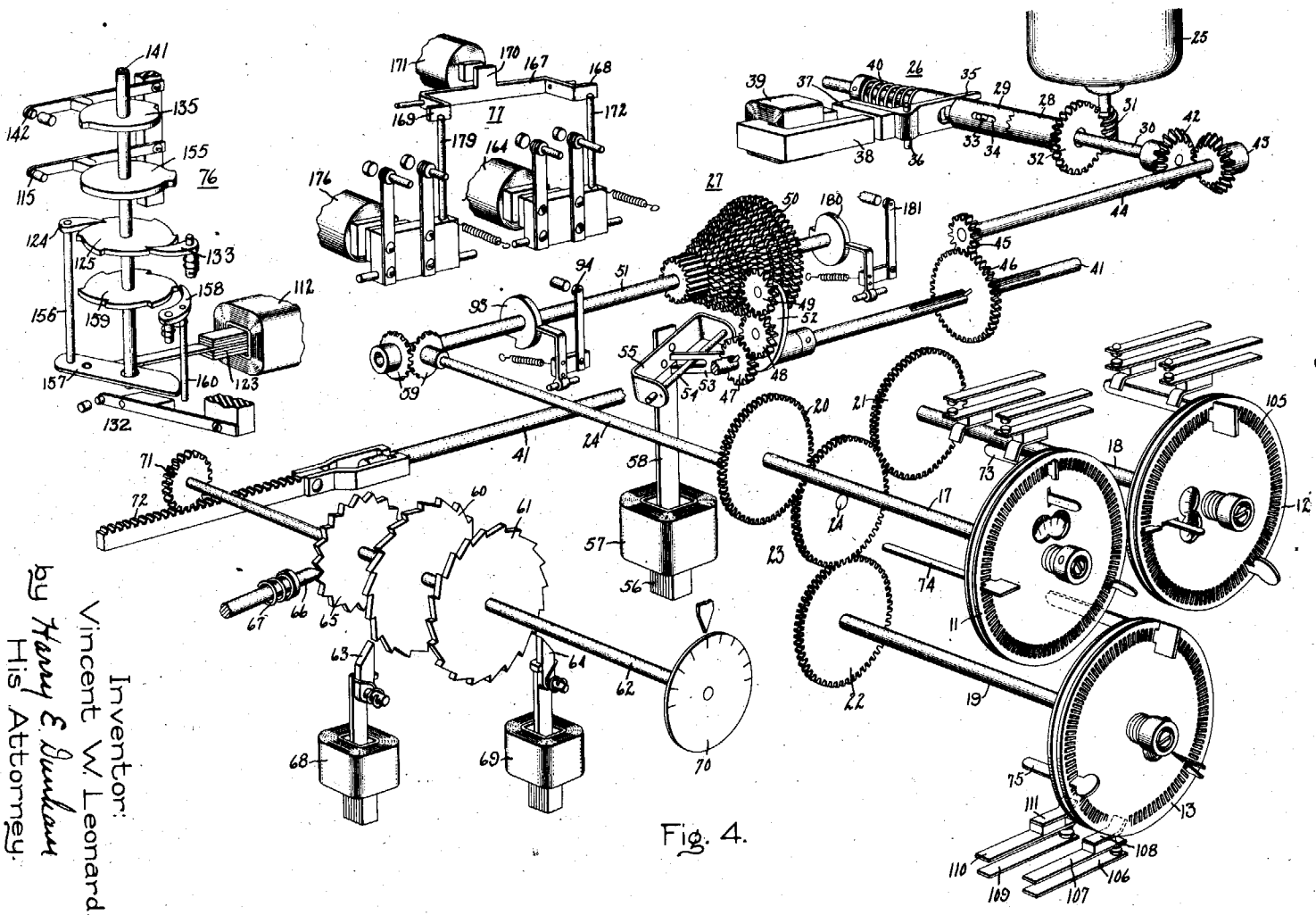
Figure 5:
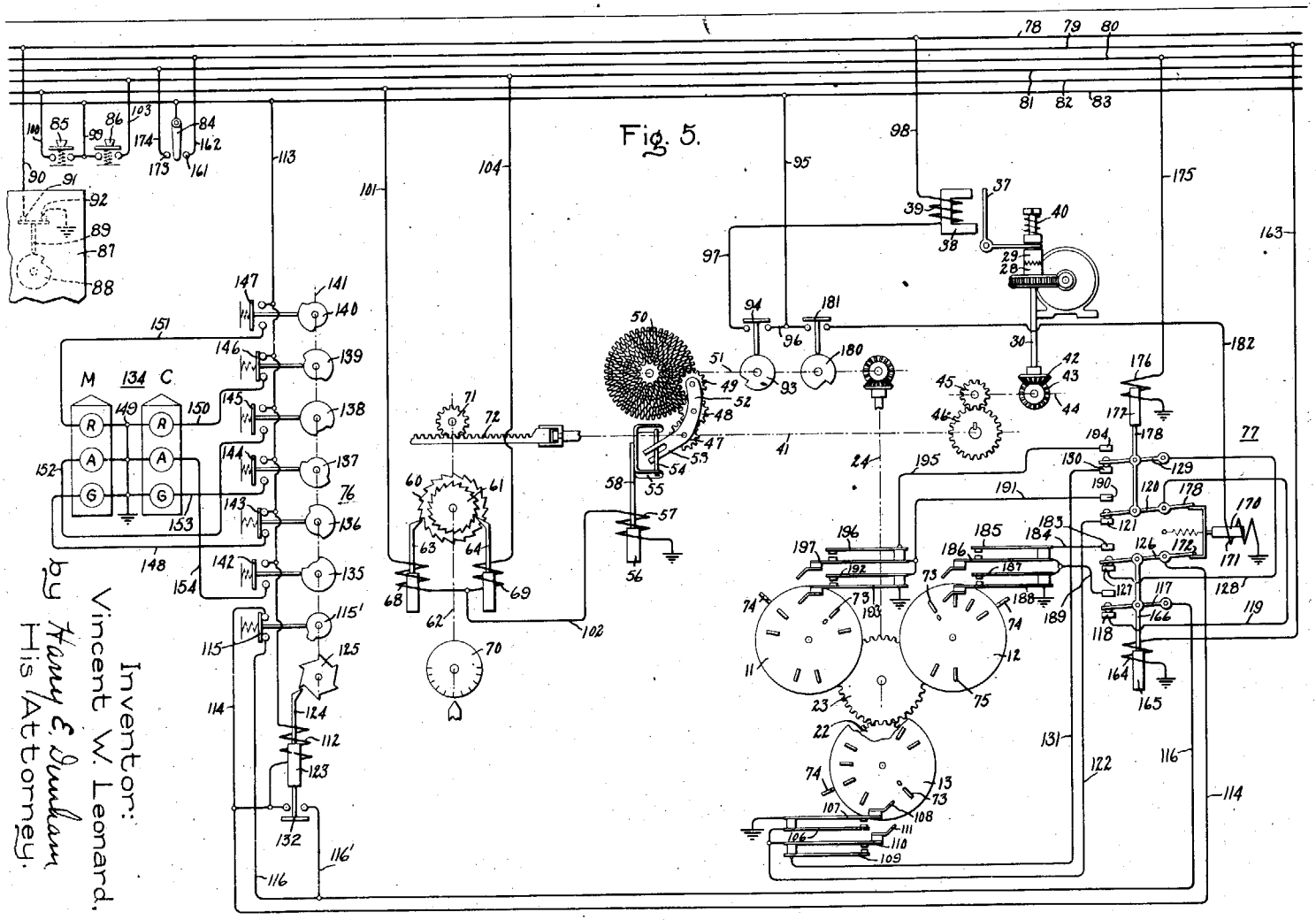

Referring to the drawings, Fig. 1 illustrates a front view of an improved controller built in accordance with my invention. The cover of this controller is partially broken away to give a clear view of the dials and contacts controlled thereby; Fig. 2 is a detail view of the dials shown in Fig. 1; Fig. 3 is an end view of the dial of Fig. 2 shown partially in section; Fig. 4 is an exploded view, partly diagrammatic, of the controller of Fig. 1; and Fig. 5 is a diagram of connections illustrating the connection between the elements of the controller and the method of adjusting the controller from a central control station.

Referring to the drawings in detail, Figs. 1 and 4 illustrate a traffic signal controller 10 provided with three dials 11, 12, and 13, each of which represents a separately adjustable schedule of operation for that controller. The dials are mounted in front of a panelboard 14 and are normally protected by a cover 15 hinged to the panel 14 and provided with windows 16. The dials are respectively mounted on and rotated by shafts 17, 18, and 19. The shafts are respectively provided with gear wheels 20, 21, and 22, each engaging a gear 23 mounted on a common drive shaft 24. The gears 20, 21, and 22 are all provided with the same number of teeth so that the three dials are driven at the same speed by the shaft 24.

The common drive shaft 24 is driven by a motor 25, preferably a self-starting synchronous motor, through a clutch 26 and speed changing gears 27. The clutch 26 comprises a pair of co-operating members 28 and 29. Member 28 is loosely mounted on a shaft 30 and is driven by the motor 25 through a worm gear 31 and worm wheel 32. The member 29 is keyed to the shaft 30 by a pin 33 and slot 34. This member is moved in and out of engagement with member 28 by a forked lever 35 pivoted at 36. An armature 37 is attached to the forked lever 35. This armature is attracted by a core 38 when a coil 39 mounted thereon is energized. When the armature is attracted, it moves the member 29 out of engagement with member 28 against the force of a spring 40 to open the clutch and thereby stop the controller.

The clutch shaft 30 operates an idler shaft 41 of the speed changing device through a pair of bevel gears 42 and 43, shaft 44 and spur gears 45 and 46. The idler shaft 41 carries a set of interacting idler gears 47, 48, and 49, the first of which is keyed to shaft 41, and the third, being connected to the first through the second gear, engages a nest of gears 50 mounted on a shaft 51. The gears 48 and 49 are mounted on an arm 52 which is pivoted on the idler shaft 41 and may be moved about its pivot so as to engage or disengage idler gear 49 with the gear nest 50. The means of moving the arm 52 about its pivot is a forked lever arm 53 and a bar 54 mounted on a frame 55. The frame 55 is attached to the core 56 of a magnet coil 57 through bar 58. For the purpose of changing gears, shaft 41 is moved, carrying with it the idler gears 47, 48, and 49. The driving gear 46 remains stationary, axially, the shaft 41 being slidable through its hub. At each movement of the shaft 41 the coil 57 is energized to move the gears out of engagement with the gear nest. In order to hold the idlers in proper engagement with the gear nest at each driving position of the idlers, the bar 54 and frame 55, being stationary in a horizontal direction, are inclined from the horizontal. At each movement of the idler shaft, the forked arm 53 slides along the bar, thereby adjusting the position of the idler 49 to engage the gears 50. The speed changer shaft 51 is connected to the common dial drive shaft 24 by bevel gears 59.

The idler shaft 41 is moved axially by a ratchet mechanism comprising a pair of oppositely arranged ratchet wheels 60 and 61 mounted on a shaft 62 and a pair of ratchet pawls 63 and 64 for moving the wheels 60 and 61 respectively in opposite directions. A star wheel 65 mounted on the shaft 62 and a pin 66 urged into the notches on the star wheel by a spring 67 holds the shaft 62 in any position until either pawl 63 or 64 operated by coils 68 and 69 respectively move the shaft to the next notch on the star wheel. An indicator dial 70 mounted on the shaft 62 in front of the panel 14 indicates the gear ratio setting. A gear 71 attached to the other end of the shaft 62 engages a rack 72 attached to the idler shaft 41 and moves the idler gears into engagement with the proper gear in the gear nest.

The dials 11, 12, and 13 are provided with keys, such as 73, 74, and 75, which operate contacts of control switches mounted on the panel 14 in such manner that certain circuits are closed by each key as it passes the sets of contacts. These circuits cause the operation of the traffic signals through a signal switch comprising a drum controller 76. The keys in each of the three dials are spaced in accordance with a different predetermined schedule, or time cycle. The keys on only one of the three dials operate the drum controller at any one time, the operating dial being selected by a dial selector 77. This selector holds the controller to the selected schedule, or cycle, until a predetermined signal of the sequence is energized; then causes a change to a newly selected dial and schedule, or cycle, providing a different schedule has been selected at the central control station. The details of the signal operation and selector mechanism can be explained more readily by reference to Fig. 5.

In Fig. 5, I have illustrated conductors 78, 79, 80, 81, 82, and 83, which comprise the connecting cable between several intersection controllers, such as illustrated in Fig. 4, and a central control station which may be at any convenient location. This central control station includes a double-throw switch 84, comprising the schedule selector control switch; push button switches 85 and 86 comprising the speed changing switches, and a supervisory timer 87. The supervisory timer 87 may be and is preferably one of the intersection controllers. It includes a cam 88 and a switch 89 operated thereby. The switch is normally closed and connects common conductor 78 to ground through conductor 90 and contacts 91—92. The supervisory cam 88 is operated at a predetermined speed equal to the normal speed of the gear shaft 51 in each intersection controller. Each shaft 51 is provided with a cam 93, corresponding to the cam 88, and a switch 94. The switch 94 is normally open and is closed momentarily once during each signaling cycle. When the switch 94 does close, it energizes the clutch coil 39 through a circuit which may be traced from common conductor 83, the power feed conductor, conductors 95 and 96, switch 94, conductor 97, clutch coil 39, conductors 98, the synchronizing conductor 78, conductor 90, supervisory switch 89 to ground. The function of the two cams 88 and 93 is to open and close the circuit to clutch coil 39. When the intersection controller cam 93 reaches the switch 94, it closes the switch and thereby establishes a feed circuit through the supervisory switch 89 to the clutch coil 39 which then functions to declutch the timer. If at the same instant the cam 88 functions to open switch 89, the circuit to the clutch coil remains broken and the timer continues to operate. This, therefore, is the method of placing the timers in synchronism with the supervisory timer and therefore with each other.

The three dials 11, 12, and 13 each comprise a graduated core which is rigidly attached to the drive shaft, and an adjustable dial assembly which carries the keys. When the controller is assembled the keys 73, which I may term the zero keys, are set directly above the zero graduations, or marks, on the cores. The contacts for each dial are then set so that they will be simultaneously operated by the keys 73, and cam 93 is set to close contacts 94 at this instant. This adjustment is then a reference point from which each adjustment is made when the controller is put into operation. If the controller is used as a supervisory controller as above mentioned, the cam 93 is changed to a contact opening cam 88 as illustrated. This original setting of the cams with respect to the dial cores and contacts is never changed, but the zero keys may be advanced on successive controllers to obtain the necessary time interval between successive green periods on a main thoroughfare. This type of control is commonly referred to as "progressive" control since the signals change as the vehicles progress from one intersection to the next. It may be noted here that due to the assembly and subsequent adjustments just described, the synchronization between successive controllers does not necessarily take place during the main street green period. Under normal circumstances, however, this synchronizing circuit operates only once when the controllers are first started. After that the motors, running synchronously, keep the controllers in synchronism and the cams 88 and 93 merely operate to check this condition.

The push buttons 85 and 86 operate to increase or decrease the gear ratio at the timers. Button 85, when depressed, establishes a circuit from the power conductor 83 to coil 68 through conductors 99, 100, 82 and 101. The coil 68 is connected in series with coil 57 by conductor 102 and to ground. Every time button 85 is depressed, this circuit is established and coil 68 raises pawl 63 to advance the wheel 60, shaft 62, gear 71 and rack 72. The idler gears are thereby moved toward the high speed end of the gear nest. The coil 57 being simultaneously energized disengages the idler 49 and allows it to re-engage in the new position. When button 86 is depressed, a circuit is established to coil 69 through conductors 99, 103, 81 and 104. Coil 69 is also connected in series with coil 57 and to ground. Coil 69 operates pawl 64 and wheel 61, thereby moving the idler gears toward the low speed end of the gear nest.

As stated above, only one dial at a time controls the traffic signals. It is, therefore, assumed, for the sake of convenience, that dial 13 is connected to control the traffic signals. Dial 13 is provided with the three keys 73, 74, and 75. Key 73 is permanently placed in one of the peripheral slots 105 and is used as a reference key and commonly referred to as the zero key because it is usually used to mark the beginning of the green or "go" signal for the main street. A key 74 is placed in another one of the slots 105 along the periphery and marks the end of the green main street period. Other keys 75 are inserted at predetermined points in the periphery of the dial. Only one of these keys is illustrated for the sake of simplicity. The actual number of the keys 75 in each dial is dependent upon several factors which will appear in the following description.

Adjacent the path of movement of the dial keys, two pairs of spring mounted contacts are placed side by side. Thus, contacts 106 and 107 constitute one pair of contacts that are normally separated. The upper contact 107 is provided with a finger 108, which when engaged by any one of the keys, lowers the contact 107 to engage contact 106 to establish a circuit. Next to the contacts 106 and 107 is a second pair of contacts 109 and 110, contact 110 being provided with a finger 111, which when engaged by key 74, lowers the contact 110 into engagement with contact 109 to establish a circuit. It is to be noted that key 74 is longer than the keys 73 and 75. As a result thereof, the key 74 operates both pairs of contacts simultaneously, while keys 73 and 75 operate only the first pair of contacts. When the first set of contacts 106 and 107 are closed by a key, a circuit is established to a drum operating coil 112. This circuit may be traced from the common cable conductor 83 through conductor 113 to the coil 112 and through conductor 114 to switch 115. This switch being closed, current flows to conductor 116, switch arm 117 of the selector switch 77, contact 118, conductor 119, switch arm 120, contact 121, conductor 122, contacts 106 and 107 to ground. When coil 112 is thus energized, it lifts its core 123 and pawl 124. The latter engages a ratchet wheel 125 and turns the controller one notch. This operation is repeated at each closure of switch 106—107 until a cam 115' opens the switch 115. In that case, the closure of the contacts 106—107 does not energize the coil 112, but a closure of both sets of contacts establishes the circuit. This may be traced as follows: Conductors 83 and 113, coil 112, conductor 114, switch arm 126, contact 127, conductor 128, switch arm 129, contact 130, conductor 131, contacts 109, 110, conductor 122 and contacts 106 and 107 to ground. The contacts 109 and 110, therefore, shunt the open switch 15 to establish the circuit to coil 112. This is the means for synchronizing the drum controller with the dial. The long key 74 which brings about this resynchronization is usually placed at the end of the green period for the main street and cam 115' is set to open switch 115 in the main street green position of the drum controller so that if the drum controller should be out of step with the dial, the delay required for resynchronization will occur only during the main street green period.

The actuating mechanism for the drum controller 76, as stated, comprises the coil 112, which, when energized, lifts its core 123 and pawl 124. It also closes a locking circuit in shunt to the switch 115 by means of a switch 132. This switch is closed at each actuation of the core and establishes a circuit from conductors 114 to 116 through its contacts and conductor 116'. The purpose of this is to insure that the circuit to coil 112 shall remain closed until broken by contacts 106—107, that is, the circuit should not be prematurely broken at switch contacts 115 before the pawl 124 has completed its stroke. The drum controller comprises a series of cams for operating switches which in turn open and close, in a predetermined sequence, the circuits to a set of traffic signals 134. The signals are illustrated in a conventionel diagrammatic manner comprising two groups of three signals each, designated by the letters "M" for main street and "C" for cross street. Each group contains the conventionel "R" signal for the "stop" indication, "A" for the "caution" indication and "G" for the "go" indication. A group of cams 135 to 140 arranged on a cam shaft 141 operate respectively a series of switches 142 to 147 for energizing the signals. In Fig. 5, switches 143 and 146 are illustrated as being closed whereby the "G" signal for the main street and the "R" signal for the cross street are energized. The circuits may be traced from conductor 113, switch 143 conductor 148 signal "G" main and common conductor 149 to ground. The other circuit may be traced from conductor 113, switch 146, conductor 150, signal "R" cross to ground. In the same manner, switch 147, when closed, energizes the "R" main signal through conductor 151; switch 145 controls "A" main through conductor 152; switch 144 controls "G" cross through conductor 153 and switch 142 controls "A" cross, through conductor 154.

The operating mechanism for the drum controller is shown in somewhat greater detail in Fig. 4. In this figure, the coil armature 123 is connected to a pivoted cam 157, on one end of which the pawl 124 is mounted by means of a pin 156. A second pawl 158 co-operating with a ratchet wheel 159 is arranged to prevent a movement of the drum beyond its predetermined position. When the coil 112 draws in its armature 123, the cam surface at the opposite end of the cam 157 drops the pawl 158 into a notch in wheel 159 by releasing a pin 160. The drum meanwhile moves one full position until the pawl 158 reaches the end of the notch and stops further movement of the drum. When the coil is de-energized and pawl 124 returns to engage the succeeding notch, the drum is held stationary by a third pawl 133 which engages the ratchet wheel 125 while pawl 158 is lifted out of the notch in the wheel 159 and is held in position to enter the next notch when the coil is again energized.

The selection of the dial, as already stated, is accomplished by a selector switch 77 remotely controlled from the central control station by switch 84. In Fig. 5, the switch 84 is shown in its mid position, in which it is open circuited and the switch 77 is thereby in its normal position wherein dial 13 determines the schedule of signal operation as above described. Assuming now that switch 84 is thrown to engage the right-hand contact 161, a circuit is established from the power conductor 83, through switch 84, contact 161, conductor 162, conductors 79 and 163, coil 164 to ground. The coil 164 operates the switch arms 117 and 126 by means of an armature 165 and connecting link 166. It must be noted, however, that the switch arms cannot be moved until released by an interlocking mechanism comprising an interlocking fork 167 having arms 168 and 169, an armature 170 and an actuating coil 171. When the coil 171 is de-energized, the arm 168 engages a pin 172 and thereby prevents the energized coil from moving the switch arms 117 and 126 to the new position. The same condition exists when the central control switch 84 is thrown to the left to engage a contact 173. In that case, a circuit is established from the power conductor 83 through the switch arm 84, contact 173, conductors 174, 80 and 175, coil 176 to ground. The coil then attempts to move switch arms 120 and 129 to a second position by means of an armature 177 and link 178. This is prevented, however, by arm 169 of the fork 167 and by a pin 179 attached to the switch mechanism.

It is, therefore, possible to throw the central control switch 84 and energize either of the actuating coils of the switch, but on change of connections will take place until the coil 170 lifts the interlocking arms and permits the switch arms to take up their respective new positions. This is accomplished by a cam 180 mounted on shaft 51 and a switch 181. The cam maintains the switch in open position, but closes it momentarily once each signaling cycle. This moment is chosen to be in such relation to the green main period on the dials and signal drum that the switch 181 is closed during that period. When switch 181 is closed, it establishes a circuit to coil 170 of the interlock from the power conductor 83, conductor 95, switch 181, conductor 182, coil 170 and to ground. When the coil 170 is energized, it withdraws both arms 168 and 169. In accordance with the set-up of the switch 84, however, only one of the coils 165 and 176 can be energized at a time and only one of the two pairs of switch arms are moved when the interlock is removed.

Assuming again the switch 84 thrown to the right to engage contact 161 and the interlock being removed, the switch arms 117 and 126 will be moved to establish a circuit to a set of contacts operated by dial 12. The switch arm 126 will engage a contact 183, thereby establishing through a conductor 184 a circuit to a pair of contacts 185 and 186 similar to the contacts 109—110. Switch arm 117 establishes a circuit to a second pair of contacts 187—188 through a conductor 189. Contact 188 is grounded and contacts 186 and 187 are connected together through the conductor 189. The contacts operated by the dial 12 then advance the drum 76 as already described for dial 13.

When the central control switch 84 is thrown to the left to engage contact 173, coil 176 is energized and when the interlock operates, the coil moves the switch arms 120 and 129 to a new position. In the new position, switch arm 120 engages a contact 190 and establishes through a conductor 191 a circuit to a pair of contacts 192—193 similar to contacts 106—107. Switch arm 129 establishes a circuit through contact 194, conductor 195 to a pair of contacts 196—197 similar to the contacts 109—110. The pairs of contacts 192—193 and 196—197 are adjacent the dial 11. The circuit to the drum operating coil 112 may be traced from switch arm 120 to conductor 119, contact 118, switch arm 117 and conductor 116; also from contact arm 129 to conductor 128, contact 127, contact arm 126 and to conductor 114. The circuit through the coil 112 is completed from conductors 114 and 116 as previously explained. The switch arms 117 and 126 are in contact with the lower contacts 118 and 127 because coil 164 was de-energized when the switch 84 was thrown to the left. It may be noted here that when either coil 164 or 176 is de-energized by the central control switch 84 being moved to its central or open position from either contact 161 or 173, the forked member 167 being in its lower position prevents the contact arms from changing position. In other words, the latch or forked member 167 locks the contacts into the second position as well as the first position until the release coil 171 is energized as above explained. By means of the central control switch 84, therefore, the respective dial and contacts may be selected, but the change-over from one dial to the next is not accomplished until the interlock operates. It is an easy matter to obtain the operation of the interlock at any desired point in the operating cycle by adjusting the cam 180. It is found, however, that the most desirable place is during the right-of-way period on the main street or highway, since any prolongation at this period delays the least traffic possible.

In accordance with another phase of my invention, I have devised an improved dial for obtaining the desired adjustments in the above-described controller. Referring specifically to Figs. 2 and 3, I have illustrated, in detail, a dial built in accordance with my invention and comprising a dial core 198 which is graduated and provided with a serrated edge having serrations corresponding to the graduations on the dial core. The core 198 is mounted on a hollow shaft 199, which in turn revolves on a pin 200 rigidly attached to the panel 14. Adjacent the core 198 and pressed against it by a spring 201 is dial 202 which covers the core 198 and is provided with a window 203 through which the graduations on the dial core 198 are visible. The dial 202 is loosely mounted on a sleeve 204 which is attached to the core 198 and supports the spring 201. A collar 205 mounted on the end of the sleeve 204 holds the spring 201 under compression.

The dial 202 is provided with a series of closed slots 105 large enough to accommodate the keys 73, 74, and 75, and has attached thereto a series of rings 206 and 207 by means of rivets 208. The ring 207 is of the same outside diameter as the dial 202 and is provided with a series of slots 105′ corresponding to those in the dial and located opposite the slots 105 in the dial. Two rings 206 are used and spaced from each other from the dial 202 and ring 207 respectively by suitable spacers. The outside diameters of the rings 206 is such that they extend to approximately the center line of the slots in the dial. Open-ended slots are placed in the periphery, their depth being equal to the slots on the dial, and they are placed opposite to the slots 105 in the dial and slots 105′ in the ring, so that the keys may project through from the dial 202 to and through the ring 207.

In the space formed between the dial 202, ring 207 and the reduced diameter of the rings 206, a helical spring 209 is placed under tension. When a key is inserted through the slots of the dial 202 and the rings 206 and 207, it must necessarily displace one or more of the turns of this spring and is thereby held in the dial. In order to facilitate the spring holding the keys in place, the keys are provided with notches 210 into which the helices of the spring are forced.

The dial assembly comprising the dial 202, rings 206, 207, together with the spring 209 and the keys, is normally locked to the core by a locking lever 211 projecting through the dial 202 and provided with a knife-edge 212 for engaging the serrations on the periphery of the dial core 198. The lever 211 is pivoted on a bracket 213 attached to the back of the ring 207 and is forced into the serrations by a spring 214. By merely lifting this lever 211, the dial assembly is released from the core and may be rotated with respect to the core 198. As stated above, the serrations correspondent to the graduations on the core so that the dial may be moved to any one of the graduations desired. A pointer in the window 203 and the numbered graduations on the core are a guide to the relative displacement of the controller dials with respect to one another and with respect to the corresponding dials on other controllers in the system. The entire dial, including the core driving gear and hollow shaft, may be removed from the pin 200 by removing the screw 216 and washer 215 and at the end of the pin.

Having above described the structure of my controller, the operation thereof in a control system may be explained by reference to the drawings and several minor details that have not yet been explained. Before the several controllers are installed, the timing of the signals is at each intersection determined graphically.

By actual traffic count, for example, it may be determined what division of right-of-way at each intersection will create the least congestion. This division of the right-of-way is sometimes referred to as "percentage split." It has been found in some instances that mornings the greatest flow of traffic is into the city; at night, out of the city; and during the day, the traffic division is approximately an average between the two. The dials are, therefore, marked In, Out and Average, to indicate these three conditions and the keys are spaced in the peripheral slots so as to proportion the time between the "stop" and "go" periods of the intersecting streets for these conditions. The zero key 73 being used as a reference, the key is placed directly above the pointer in the dial window 203 and the dial is set so that this key is over the 0 graduation of the core.

The next step is to determine the time necessary for a vehicle to travel between successive intersections at the maximum allowed speed and accordingly set the dials with respect to the dial cores. For this purpose, the first controller dial is left at zero and the corresponding disk of each succeeding controller is set several divisions subsequent to that setting in order to obtain a progression of the beginnings of the green periods. This is done for each dial separately.

When the controllers are installed and the power is turned on, they all start with the dial settings just described, but will stop as soon as the synchronizing cam 93 opens the clutch. The controllers will thus individually stop their respective signals until the supervisory cam 88 breaks the clutch circuit and restarts the controllers in step with each other.

The drum operating ratchet wheel and the operating impulses in each controller are so chosen that the drum will make one complete step-by-step revolution every time the dial completes a revolution. For this reason, the total number of keys in each dial must correspond to the number of teeth in the ratchet wheel 125. The cams on the controller drum are so arranged that they will operate the signals through a complete cycle in one full revolution of the drum shaft. In Fig. 5, I have illustrated six teeth on the ratchet wheel 125 necessitating six keys in each of the dials. It must be borne in mind that the number of impulses may be greater than the number of signal combinations. It is, for example, practicable to have a greater number of teeth than the normal number of signal combinations so that additional signal combinations can be arranged subsequent to the installation of the controller. In the present illustration, the signal combinations are G main R cross, GA main R cross, R main G cross, and R main GA cross, making four combinations. Dial 13 controls the signals in the illustration. The controller assumed the G main and R cross signals when key 73 passed finger 108 in a counterclockwise direction. The following impulse occasioned by a key 75 will advance the drum one notch and will cause the opening of the interlock switch 115. A change in the signal combinations does not take place at this time, the drum cams being arranged to continue the existing signal combination for this period. The next impulse is occasioned by key 74, which shunts the interlock switch 115 and thereby advances the drum to change the signals to GA main and R cross. If the dial and drum are out of step at this impulse so that one of the short keys passes the contacts, the drum does not advance because the circuit to the drum operating coil 112 is open at switch 115. Key 74 being the only long key is the only key in each dial capable of closing the shunt circuit to the switch 115. In the present example, key 74 closes the contacts 109—110 to advance the drum. In the case of dial 12, the key 74 closes the contacts 185—186, and in the case of dial 11, it closes the contacts 196—197. The next impulse is occasioned by another key 75 and changes the signals to R main and G cross. This signal is held through the next impulse and changed by the following impulse to R main GA cross. The key 73 then returns the signals to the first combination. It is, therefore, evident that there are two impulses which are held in reserve to obtain other signal combinations by changing the cam set-up on the drum should they be desired.

The time that it takes a dial to make a revolution determines the length of a signal cycle. This time can be regulated from the central control station by means of the push buttons. If a longer cycle should be desired, push button 86 is pressed, and if a shorter cycle should be desired, the push button 85 is closed. At each closure of the respective buttons, the cycle is increased or decreased by a predetermined increment.

The dial selector switch is operated at different times of the day and is ordinarily operated to select the In dial mornings, the Out dial evenings, and is placed in the de-energized position during other periods of the day whereby the Average dial 13 operates the signals. It may be pointed out here that the change from one set of dials in the system to another set simultaneously effects the progression of traffic along the main street and the percentage split at each intersection. The positioning of the zero keys with respect to the cores determines progression, and the positioning of the keys 74 and 75 with respect to the zero key determines the percentage split.

What I claim as new and desire to secure by Letters Patent of the United States is:

1. In a traffic-signal system, the combination of a group of traffic signals, a drum switch operable step by step to energize said traffic signals in a predetermined sequence, a plurality of dials having keys mounted therein, means for simultaneously driving said dials, means for operating said drum switch step by step in accordance with the spacing of said keys in each dial respectively, and means for effecting operation of said operating means through any one of said dials and its respective keys at a time to operate said drum switch.

2. In a signal system, a plurality of controllers, a corresponding series of signals connected to each of said controllers respectively, means in each controller for operating the signals connected to it at one of a plurality of predetermined time schedules, means in each controller for simultaneously effecting operation of the signals connected to it at one of said predetermined time schedules, and means for preventing operation of said signal operating means at said selected schedule in each controller until a predetermined signal is energized by said controller.

3. In a signal system, the combination of a plurality of control switches, a single set of signals, means for operating said signals in a predetermined sequence and at time intervals controlled by said switches respectively, a dial for operating each switch at a predetermined time schedule, a selector switch for connecting the switch controlled by any one of said dials to said signal operating means, and means for preventing the operation of said selector switch until a predetermined one of said signals is energized.

4. In a signal system, the combination of a plurality of control switches, a set of signals, means for operating said signals in a predetermined sequence connected to be controlled by said switches respectively, a selector switch connected between said control switches and said signals for connecting any one of said control switches to control said signals, and interlocking means attached to said selector switch for preventing the operation of the said selector switch until a predetermined signal is energized.

5. In a signal controller, the combination of a plurality of control switches, means for actuating said switches at any one of a plurality of predetermined schedules, a signal switch, means responsive to each actuation of any one of said control switches respectively to advance said signal switch, a selector switch operable to connect any one of said control switches to said signal switch advancing means, and interlocking means for preventing a change of said control switch connections until said signal switch is in a predetermined position.

6. In a traffic-signal system, the combination of traffic signals and circuits therefor for a main and an intersecting street, a drum switch operable to energize said signals in predetermined combinations, means for operating said drum switch step by step including a plurality of control switches, an actuating dial for each of said control switches operable to control said signals at predetermined time schedules respectively, a selector switch connected between said control switches and said drum operating means operable to connect said control switches so as to effect the control of said signals by one dial at a time, and interlocking means for preventing an operation of said selector switch until the right of way for said main street is indicated by said signals.

7. In a signal controller, the combination of a signal circuit switch operable to energize predetermined signal combinations successively, means for operating said signal switch in accordance with any one of a plurality of predetermined time schedules including a plurality of control switches and adjustable actuating means for said control switches respectively, a selector switch operable to connect any one of said control switches to control said signal switch including remote controlled actuating means for said selector switch and an interlock normally preventing an operation of said selector switch, and means operated by said control switch actuating means for releasing said interlock when a predetermined signal combination is energized.

8. In a traffic signal control system, the combination of a series of controllers, each controller including a signal switch operable to energize predetermined signal circuit combinations successively, means for operating said switch at any one of a plurality of time schedules and means for effecting an operation of said switch operating means at any one of said schedules including a selector switch provided with movable contacts, operating magnets for moving said contacts, and interlocks for normally preventing a moving of said contacts, central station control means for simultaneously energizing a predetermined one of the operating magnets in each selector switch, and means within each controller respectively for operating said interlock to release the contacts of said selector switch when the signal switch in said controller has energized a predetermined signal combination.

9. In a signal system, the combination of a plurality of control switches, a set of signals, means for operating said signals in a predetermined sequence connected to be controlled by said switches respectively, a selector switch connected between said control switches and said signals for connecting any one of said control switches to control said signals, and interlocking means associated with said selector switch for preventing the operation of said selector switch until a predetermined signal is energized.

10. In a signal controller, the combination of a signal switch operable to energize predetermined signal circuit combinations successively, means for operating said signal switch in accordance with any one of a plurality of predetermined time schedules including a plurality of control switches and adjustable actuating means for said control switches respectively, a selector switch operable to connect any one of said control switches to control said signal switch including a remote controlled actuating means for said selector switch and an interlock normally preventing an operation of said selector switch, and means for releasing said interlock when a predetermined signal combination is energized.

11. In a traffic signal control system, the combination of a plurality of controllers each of said controllers including a signal switch operable to energize predetermined signal circuit combinations successively, means for operating said switch at any one of a plurality of time schedules, and means for effecting a change in the operation of said switch operating means from any one of said schedules to another of said schedules comprising a selector switch provided with movable contacts, operating magnets for moving said contacts, and interlocks for normally preventing a movement of said contacts, means for operating said interlocks to release the contacts of said selector switch when the signal switch has energized a predetermined signal combination, and central station control means for simultaneously energizing a predetermined one of the operating magnets in each selector switch of said plurality of controllers in the system.

12. In a traffic signal controller, the combination of a plurality of primary dials provided with adjustable switch actuating members, a stationary switch associated with each primary dial and arranged to be actuated by the actuating members of that dial, a secondary dial associated with each primary dial, driving means for driving said secondary dials in a fixed relation relatively to each other, and locking means for locking each primary dial in any one of a predetermined number of positions relatively to its associated secondary dial, whereby all the switch actuating members of a dial may be moved simultaneously relatively to the switch actuating members of the other primary dials in the controller.

13. In a traffic controller, the combination of a rotatable shaft, a plurality of secondary dials, shafts for driving said dials respectively, means for driving said secondary dials in a predetermined fixed relationship relatively to each other and to said shaft, primary dials associated with said secondary dials respectively, locking means operable to lock said primary dials in any desired angular relationship to its respective secondary dial, keys in said dials and switching means associated with each dial respectively and mounted in a fixed position relatively to each of said dials respectively whereby said switches may be operated in any desired relationship dependent upon the adjustment of said primary dials relatively to said secondary dials.

14. In a traffic signal controller the combination of a rotatable shaft, a plurality of secondary shafts, means for driving said secondary shafts in a fixed relationship from said drive shaft, secondary dials attached to each of said secondary shafts respectively, primary dials mounted upon each of said secondary shafts respectively, and rotatable relatively to said secondary dials respectively, said primary dials being provided with peripheral slots, keys mounted in predetermined ones of said slots in each primary dial, switch members mounted in fixed and operative relationship to the keys in each of said primary dials respectively, and means for locking each primary dial in any one of a plurality of positions relatively to its secondary dial whereby the switch members are operated in a relationship determined by the relative adjustments of said primary dials relatively to their respective secondary dials.

15. In a traffic signal controller for controlling "stop" and "go" signals for intersecting main street and cross street traffic lanes, the combination of a signal controlling drum, actuating means for imparting step-by-step turning movements to said drum, a synchronizing switch, means on said drum for operating the synchronizing switch in the main street "go" position of said drum, a first circuit closer, a second circuit closer, a dial, a plurality of keys carried by the dial for operating the first circuit closer, a key carried by the dial for operating the second circuit closer, said keys being adjustable on the dial relatively to each other, an operating circuit for said drum actuating means including said synchronizing switch and said first circuit closer, and a second operating circuit for said drum actuating means in shunt to said synchronizing switch and including said second circuit closer, whereby resynchronizing between said signal controlling drum and said dial occurs always during a main street "go" period.

16. In a signal controller, the combination of a plurality of signal switches, a drum having cams for operating said signal switches, a synchronizing switch, a cam on the drum for operating said synchronizing switch, means for imparting step-by-step turning movement to said drum, a first circuit closer, a second circuit closer, a dial, means for rotating the dial, a plurality of keys carried by the dial for operating the first circuit closer, a key carried by the dial for operating the second circuit closer, said keys being adjustable on the dial relatively to each other, a normal operating circuit for said drum operating means including said synchronizing switch and said first circuit closer, and a synchronizing circuit for said drum operating means in shunt to said synchronizing switch and including said second circuit closer.

17. In a traffic signal controller, a first circuit closer, a second circuit closer, a plurality of actuators for the first circuit closer, an actuator for the second circuit closer, members on which said circuit closers and said circuit closer actuators are mounted, means for rotating one of said members relatively to the other to effect operation of said circuit closers by said actuators, signal switches, a drum having cams for operating the signal switches, a synchronizing switch, a cam on the drum which in a predetermined position of the drum operates the synchronizing switch, actuating means for advancing the drum step-by-step, an operating circuit for the actuating means including said first circuit closer and said synchronizing switch, and an operating circuit for said actuating means in shunt to said synchronizing switch and including said second circuit closer.

18. In a traffic signal controller, a first circuit closer, a second circuit closer, a plurality of circuit closer actuators comprising circumferentially adjustable keys, members on which said circuit closers and said circuit closer actuators are respectively mounted, means for rotating one of said members relatively to the other to effect operation of the circuit closers by said keys, a signal circuit controller, means including an electrical device for moving said signal circuit controller through a cycle of successive positions, a switch actuated by said signal circuit controller in one of its positions, an operating circuit for said electrical device including said first circuit closer and said switch, and a synchronizing circuit for said electrical device in shunt to said switch and including said second circuit closer.

19. In a traffic signal controller for controlling traffic directing signals for intersecting main street and cross street traffic lanes, the combination of a drum having switch-actuating cams for the traffic directing signals, means for imparting step-by-step movements to said drum, a synchronizing switch, a cam on the drum which in one position of said drum actuates the synchronizing switch, a first circuit closer, a circuit connecting the first circuit closer to said drum actuating means and including said synchronizing switch, a second circuit closer, a circuit connecting said second circuit closer to said drum actuating means and in shunt to said synchronizing switch, a dial, means for rotating the dial, a plurality of spaced actuators carried by the dial for operating the first circuit closer, and an actuator carried by the dial for operating the second circuit closer, said last named actuator and said synchronizing actuating cam being positioned on the dial and drum respectively to effect resynchronizing during a desired traffic signal period.

20. In a traffic signal system for controlling "stop" and "go" signals for intersecting main street and cross street traffic lanes, the combination of a first means for effecting signal operations comprising a signal circuit controlling member, means for moving it to successive positions to effect actuation of the traffic signals, a dial, means for rotating it, actuators carried by the dial, and means operated by said actuators and connected to said moving means for effecting movement of the signal circuit controlling member to its successive positions, a second means for effecting signal operations; means for transferring control from said first means to said second means, and means whereby said transfer is made during a predetermined signalling position of said signal circuit controlling member.

VINCENT W. LEONARD.